(12) United States Patent
Reddy et al.

(10) Patent No.: US 8,452,736 B2
(45) Date of Patent: May 28, 2013

(54) FILE CHANGE DETECTION

(75) Inventors: Chandra Reddy, South Setauket, NY (US); Prashant Parikh, Holtsville, NY (US)

(73) Assignee: CA, Inc., Islandia, NY (US)

( * ) Notice: Subject to any disclaimer, the term of this patent is extended or adjusted under 35 U.S.C. 154(b) by 396 days.

(21) Appl. No.: 12/130,548

(22) Filed: May 30, 2008

(65) Prior Publication Data
US 2009/0228533 A1 Sep. 10, 2009

Related U.S. Application Data

(60) Provisional application No. 61/033,920, filed on Mar. 5, 2008.

(51) Int. Cl.
*G06F 7/00* (2006.01)
*G06F 17/00* (2006.01)

(52) U.S. Cl.
USPC .......................................... 707/687; 707/698

(58) Field of Classification Search
None
See application file for complete search history.

(56) References Cited

U.S. PATENT DOCUMENTS

| | | |
|---|---|---|
| 4,876,541 A | 10/1989 | Storer |
| 5,414,650 A | 5/1995 | Hekhuis |
| 5,778,395 A | 7/1998 | Whiting et al. |
| 6,615,225 B1 | 9/2003 | Cannon et al. |
| 6,704,730 B2 | 3/2004 | Moulton et al. |
| 6,785,786 B1 | 8/2004 | Gold et al. |
| 6,799,206 B1 | 9/2004 | Workman et al. |
| 7,257,257 B2 * | 8/2007 | Anderson et al. ............. 382/187 |
| 7,685,171 B1 * | 3/2010 | Beaverson et al. .... 707/999.202 |
| 7,761,425 B1 | 7/2010 | Erickson et al. |
| 8,099,605 B1 | 1/2012 | Billsrom et al. |
| 2004/0236803 A1 | 11/2004 | Spiegeleer |
| 2005/0114614 A1 * | 5/2005 | Anderson et al. ............. 711/162 |
| 2005/0177725 A1 * | 8/2005 | Lowe et al. .................... 713/176 |
| 2005/0283500 A1 | 12/2005 | Eshghi et al. |
| 2006/0059207 A1 | 3/2006 | Hirsch et al. |
| 2006/0085561 A1 | 4/2006 | Manasse et al. |
| 2006/0184652 A1 | 8/2006 | Teodosiu et al. |
| 2007/0022144 A1 | 1/2007 | Chen |
| 2007/0088973 A1 | 4/2007 | Passerini et al. |
| 2007/0266062 A1 * | 11/2007 | Young ............................ 707/204 |
| 2007/0288533 A1 | 12/2007 | Srivastava et al. |
| 2008/0109448 A1 * | 5/2008 | Aboel-Nil et al. ............... 707/10 |
| 2008/0243953 A1 * | 10/2008 | Wu et al. ......................... 707/204 |
| 2009/0177721 A1 * | 7/2009 | Mimatsu ........................ 707/205 |
| 2009/0228484 A1 | 9/2009 | Reddy et al. |
| 2009/0228522 A1 | 9/2009 | Reddy et al. |
| 2009/0228680 A1 | 9/2009 | Reddy et al. |
| 2010/0115003 A1 | 5/2010 | Soules et al. |

OTHER PUBLICATIONS

U.S. Appl. No. 12/130,514, Decision on Pre-Appeal Brief Request mailed May 11, 2011, 2 pgs.

(Continued)

*Primary Examiner* — Cheryl Lewis
*Assistant Examiner* — Raheem Hoffler
(74) *Attorney, Agent, or Firm* — Schwegman Lundberg & Woessner, P.A.

(57) ABSTRACT

A system and method include selecting a file for potential backing up. A metadata signature is calculated on the selected file. The metadata signature of the selected file is compared to a metadata signature of a corresponding file already backed up. The file is only backed up the file if the signatures do not match.

19 Claims, 10 Drawing Sheets

OTHER PUBLICATIONS

U.S. Appl. No. 12/130,514, Final Office Action mailed Feb. 16, 2011, 20 pgs.
U.S. Appl. No. 12/130,514, Non Final Office Action mailed Jul. 15, 2011, 20 pgs.
U.S. Appl. No. 12/130,514, Non-Final Office Action mailed Sep. 22, 2010, 20 pgs.
U.S. Appl. No. 12/130,514, Pre-Appeal Brief Request filed May 2, 2011, 4 pgs.
U.S. Appl. No. 12/130,514, Preliminary Amendment filed May 30, 2008, 3 pgs.
U.S. Appl. No. 12/130,514, Response filed Oct. 5, 2011 to Non Final Office Action mailed Jul. 15, 2011, 9 pgs.
U.S. Appl. No. 12/130,514, Response filed Dec. 22, 2010 to Non Final Office Action mailed Sep. 22, 2010, 9 pgs.
U.S. Appl. No. 12/130,517, Final Office Action mailed Mar. 1, 2011, 11 pgs.
U.S. Appl. No. 12/130,517, Non Final Office Action mailed Nov. 9, 2011, 10 pgs.
U.S. Appl. No. 12/130,517, Non-Final Office Action mailed Oct. 1, 2010, 12 pgs.
U.S. Appl. No. 12/130,517, Preliminary Amendment filed May 30, 2008, 3 pgs.
U.S. Appl. No. 12/130,517, Response filed Jan. 3, 2011 to Non Final Office Action mailed Oct. 1, 2010, 8 pgs.
U.S. Appl. No. 12/130,517, Response filed Jun. 1, 2011 to Final Office Action mailed Mar. 1, 2011, 7 pgs.
U.S. Appl. No. 12/130,637, Non Final Office Action mailed Jul. 8, 2011, 7 pgs.
U.S. Appl. No. 12/130,637, Notice of Allowance mailed Sep. 7, 2011, 9 pgs.
U.S. Appl. No. 12/130,637, Response filed Aug. 11, 2011 to Non Final Office Action mailed Jul. 8, 2011, 10 pgs.
U.S. Appl. No. 12/130,514 , Response filed Feb. 13, 2012 to Non Final Office Action mailed Nov. 28, 2011, 13 pgs.
U.S. Appl. No. 12/130,514, Final Office Action mailed Mar. 22, 2012, 22 pgs.
U.S. Appl. No. 12/130,514, Non Final Office Action mailed Nov. 28, 2011, 21 pgs.
U.S. Appl. No. 12/130,517 , Response filed Feb. 9, 2012 to Non Final Office Action mailed Nov. 9, 2011, 9 pgs.
U.S. Appl. No. 12/130,637, Notice of Allowance mailed Mar. 22, 2012, 10 pgs.
U.S. Appl. No. 12/130,637, Notice of Allowance mailed Nov. 28, 2011, 9 pgs.

* cited by examiner

FILE CHANGE DETECTION

RELATED APPLICATIONS

This is a United States Patent Application that claims priority under 35 U.S.C. §119(e) to United States Provisional Patent Application titled "SYSTEM AND METHOD OF SEARCHING FOR DUPLICATE DATA," (Ser. No. 61/033,920) filed on Mar. 5, 2008 which is incorporated by reference in its entirety herein.

BACKGROUND

Data is very important to individuals and businesses. Many businesses regularly back up data stored on computer systems to avoid loss of data should a storage device or system fail or become damaged. One current data backup trend is to backup data to disks and use tapes for long term retention only. The amount of disk space needed to store a month's backup can be very large, such as around 70 terabytes in some examples. The amount of data will likely only be increasing going forward.

One strategy for backing up data involves trying to back up data that has changed, as opposed to all of the data, and then using prior backups of unchanged data to reconstruct the backed up data if needed. In one approach, data may be divided into fixed size blocks. An MD5 hash or a SHA256 hash may be calculated on the data belonging to the fixed size block of data, resulting in an MD5 signature for each block of data. The MD5 signature may be searched against an in memory database or an embedded database of previous MD5 signatures.

The next time the file is backed up, signatures are generated for the blocks and searched against the database of signatures to find duplicates if any data has changed. Only the changed blocks need be saved during the backup.

SUMMARY

A computer method comprises selecting a file for potential backing up, calculating a metadata signature on the selected file, comparing the metadata signature of the selected file to a metadata signature of a corresponding file already backed up, and only backing up the file if the signatures do not match.

In a further embodiment, a computer implemented method comprises selecting a file for potential backing up, obtaining metadata for the file, the metadata including a file path and size, file attributes, file security access control lists, and dates of last modification and creation of the file, calculating a metadata signature hash on the selected file, comparing the metadata signature of the selected file to a metadata signature of a corresponding file already backed up, and only backing up the file if the signatures do not match.

In yet a further embodiment, a computer readable medium has instructions for causing a computer to execute a method, the method comprising selecting a file for potential backing up, calculating a metadata signature on the selected file, comparing the metadata signature of the selected file to a metadata signature of a corresponding file already backed up, and only backing up the file if the signatures do not match.

In still a further embodiment, a system comprises a backup agent adapted to couple to a data storage system and receive file data and metadata and calculate a signature for each file as a function of the metadata, and a backup server coupled to receive the metadata signature from the backup agent and compare the metadata signature for a file to a metadata signature of an already backed up corresponding file, and if the signature do not match, backing up the file corresponding to the metadata signature created by the backup agent.

DETAILED DESCRIPTION

Figure 1:
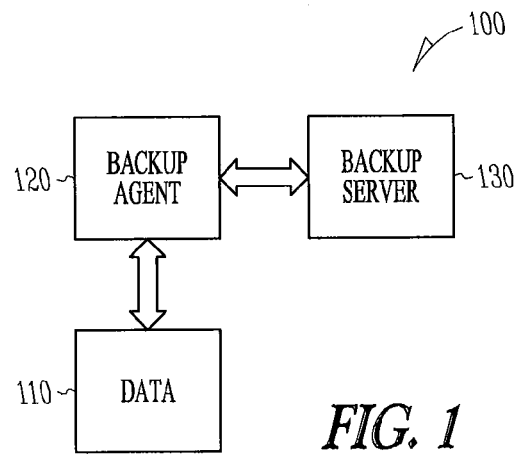
FIG. 1 is a block diagram of a system for backing up data according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A backup agent creates a signature (MD5 in one embodiment) based on metadata rather than the corresponding data in a file to be backed up. In one embodiment, the metadata includes one or more of the full path of the data file, the last modified data, the creation data, its security (access control lists (ACLs)+the attributes) including the archive bit. A backup server for each file compares this signature with its last signature for the same file. If the signature is not changed for the same file then the backup server will assume that the file is not changed and will not be storing the data of the file for this backup. Instead it will be referencing to the data of the file stored with the last backup. Hence it will save space at the backup server. It achieves the space savings through identification of unchanged data without having to process all of the data to create a signature. This can save significant time and CPU resources.

For every file that the backup agent sends to the server the agent will calculate a meta data signature (such as MD5, SLA1, or other type of algorithm that is likely to produce different signatures for different data input) based on one or more of the full path to the file, size of the file, file attributes (including an archive bit), file security ACLs, date the file was last modified and created. The meta data signature is sent to the backup server. For each file received by the backup server, the meta data signature is compared with the meta data signature of the same file when it was last backed up. If the meta data signatures match, then the backup server will ignore all the data of the file (for the current backup) and will reference to the last backup data.

Using the meta data signatures, the backup server can very quickly determine whether a file has changed or not. If changed the server will proceed with a normal back up of the data. If not the server will utilize previously backed up data as part of a back up process.

FIG. 1 is a block diagram of a system 100 for backing up data in a data storage 110 for a system. The data storage 100 corresponds to one or more memory devices, such as disk drives in a central system or distributed system. The system may be an enterprise system consisting of a server farm with several remote terminals coupled via network. Data storage 100 may be directly coupled to a backup agent 120, or connected via a network. The backup agent 120 is coupled to a backup server 130, which in one embodiment comprises a processor and disk drive storage for quickly backing up the data storage 110. The backup agent 120 and backup server 130 may be directly coupled, or coupled via a network in various embodiments.

In one embodiment, the backup server 130 compares signatures of data stored in the data storage 110 to signatures of data already backed up by backup server 130. If signatures match, the data having matching signatures is already backed up, and need not be backed up again. The data may be compared on a file level, or on any other level, such as fixed or variable size chunks of a desired length. In one embodiment, a file is a set of data that has certain metadata associated with it, such as a path used by an operating system to store and retrieve data. Other metadata may include file size, attributes, security information and modification and creation dates.

Figure 2:
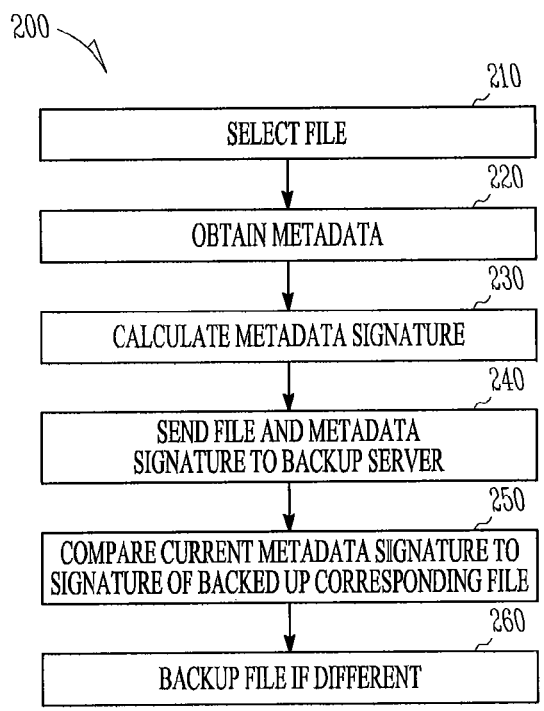
FIG. 2 is a flowchart describing a method of determining whether or not a data file is duplicative of an already backed up data file.

FIG. 2 is a flow chart illustrating a method 200 of determining if files have been changed since they were last backed up. At 210, a file is selected for backup by the backup agent 120 in one embodiment. Metadata is obtained at 220, and a metadata signature is calculated at 230. The metadata signature may be any type of signature which is very likely to be unique for all files, and may be an MD5 type hash in one embodiment. Other algorithms may also be used in various embodiments. At 240, the file and the metadata signature is sent to the backup server 130, which compares the current metadata signature with the signature of the corresponding backed up file. In one embodiment, the backup agent need not send the file with the metadata signature, but such file may be sent to the backup server 130 if it needs to be backed up. The metadata signature may be accompanied by an identification of the file to allow ease of finding corresponding signatures of already backed up files. If the signatures are different at 260, the file is backed up.

Figure 3:
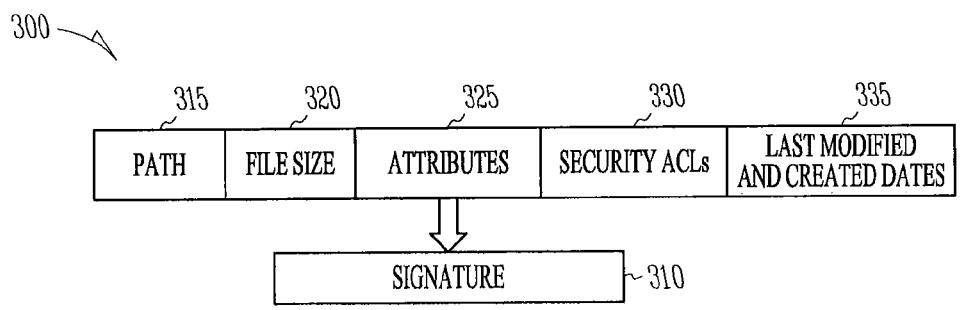
FIG. 3 is a block diagram of metadata from a data file and a resulting metadata signature according to an example embodiment.
Figure 4A:
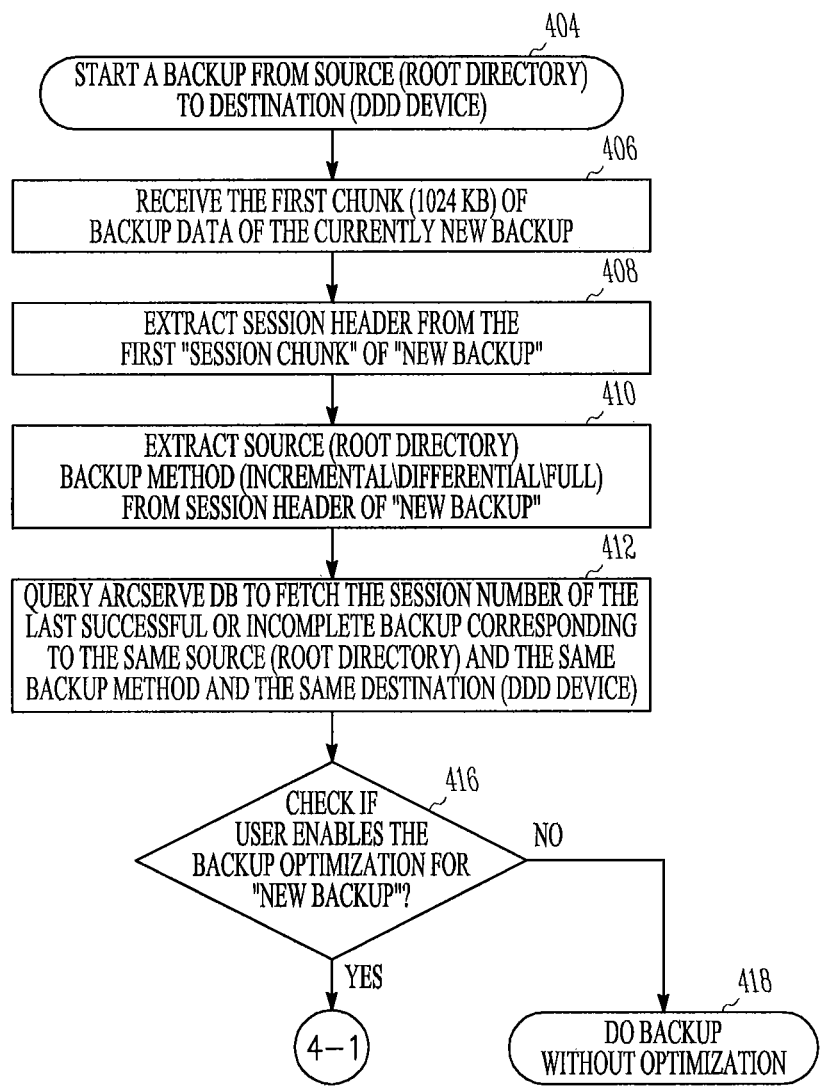
FIGS. 4A, 4B, 4C, 4D, 4E, 4F and 4G are a detailed flow chart illustrating a computer implemented method of reducing hash processing for files which remain unchanged during a backup according to an example embodiment.
Figure 4B:
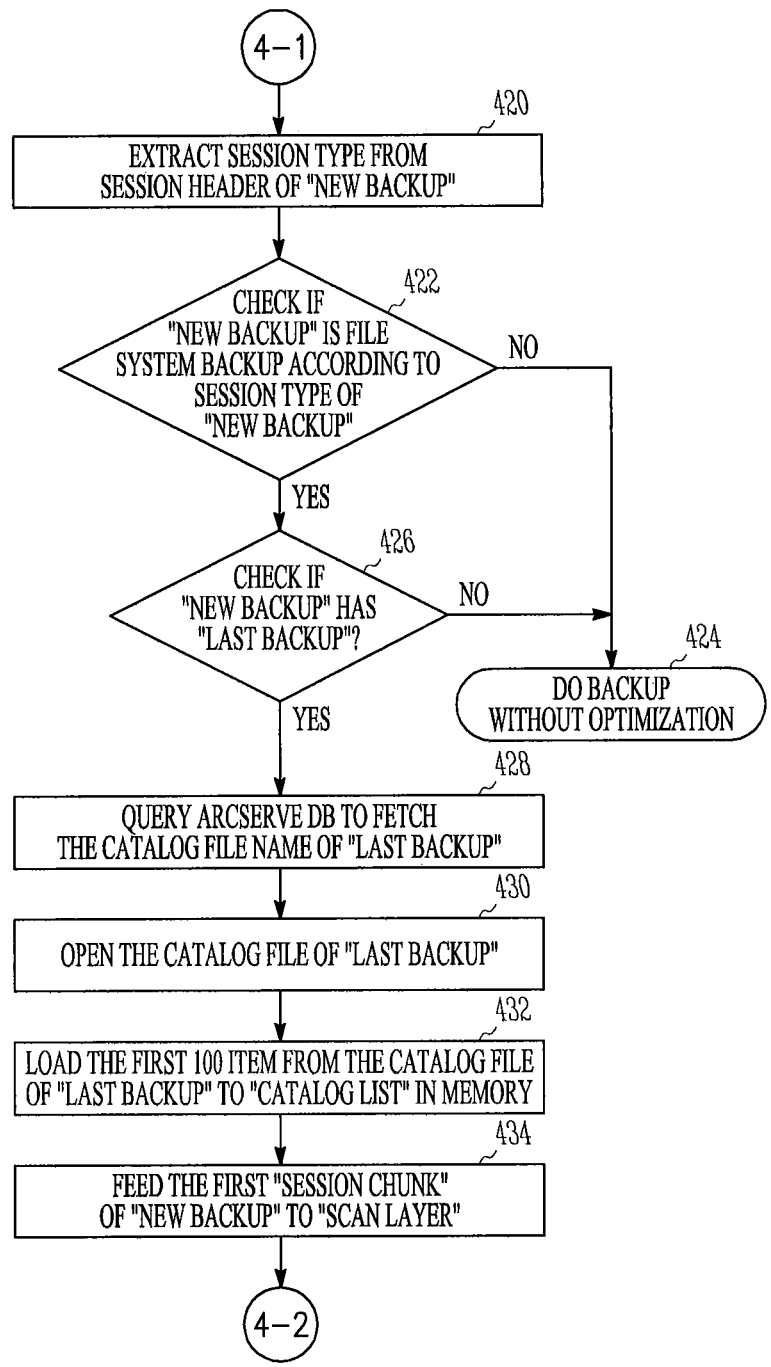
Figure 4C:
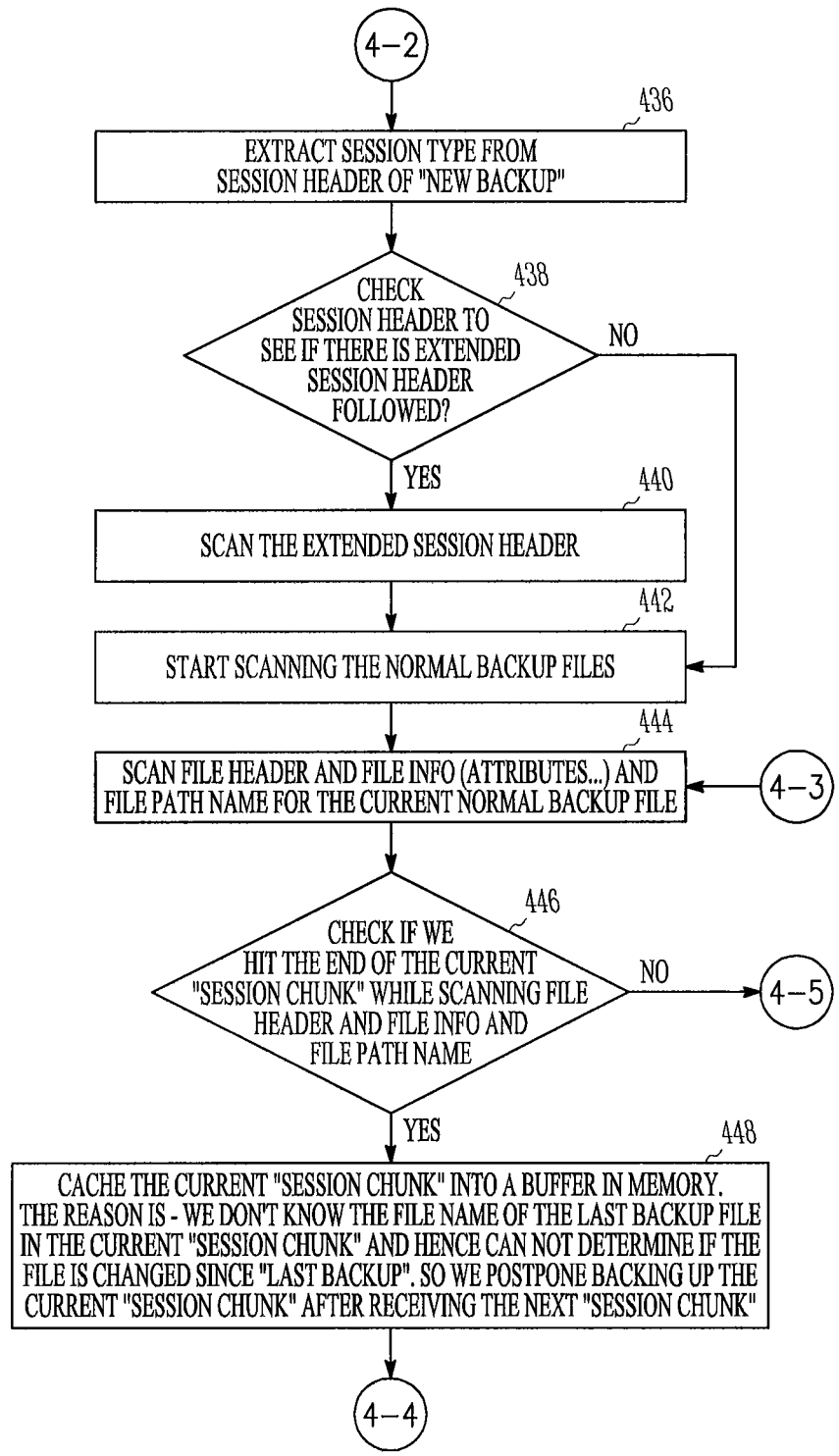
Figure 4D:
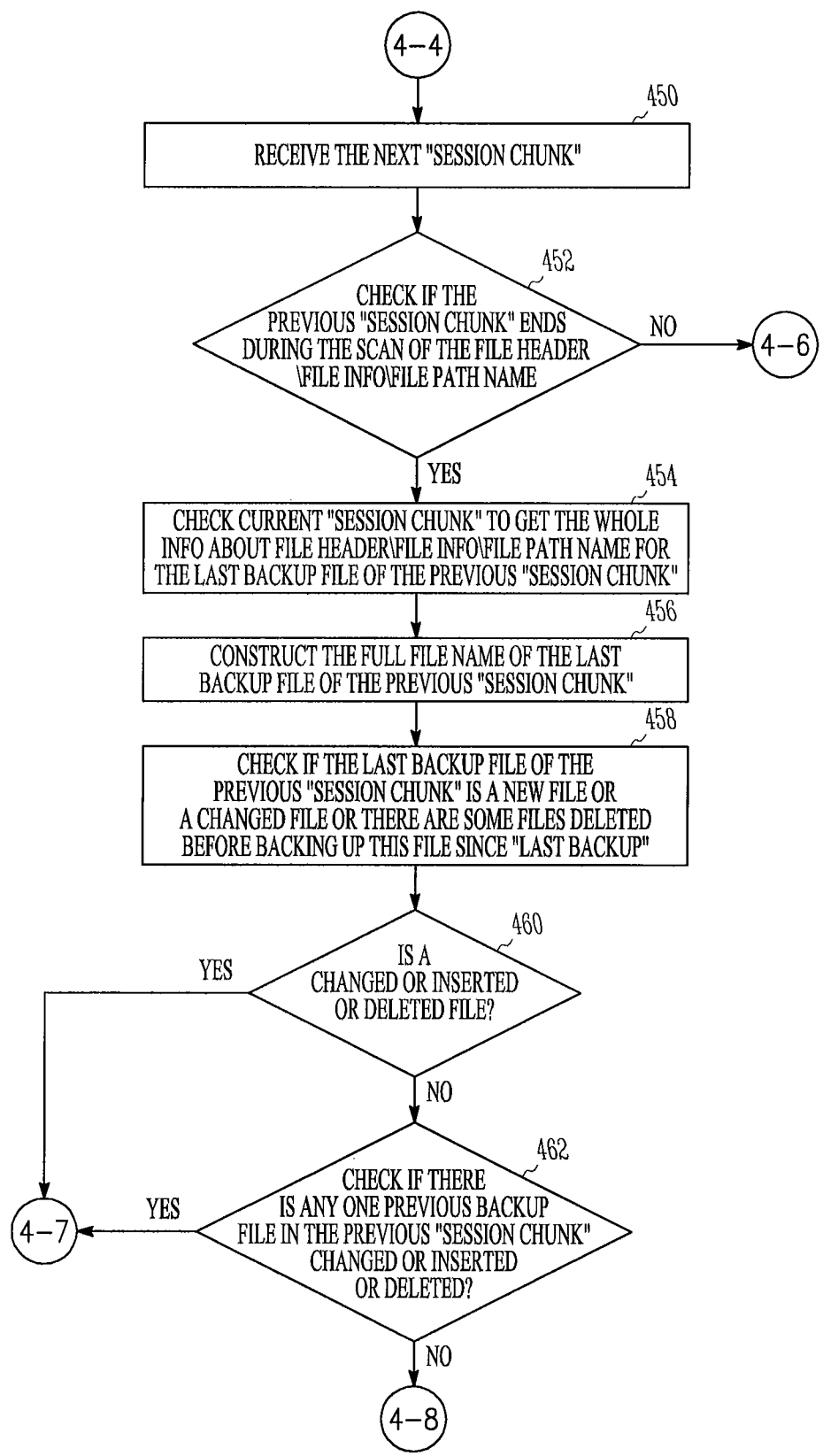
Figure 4E:
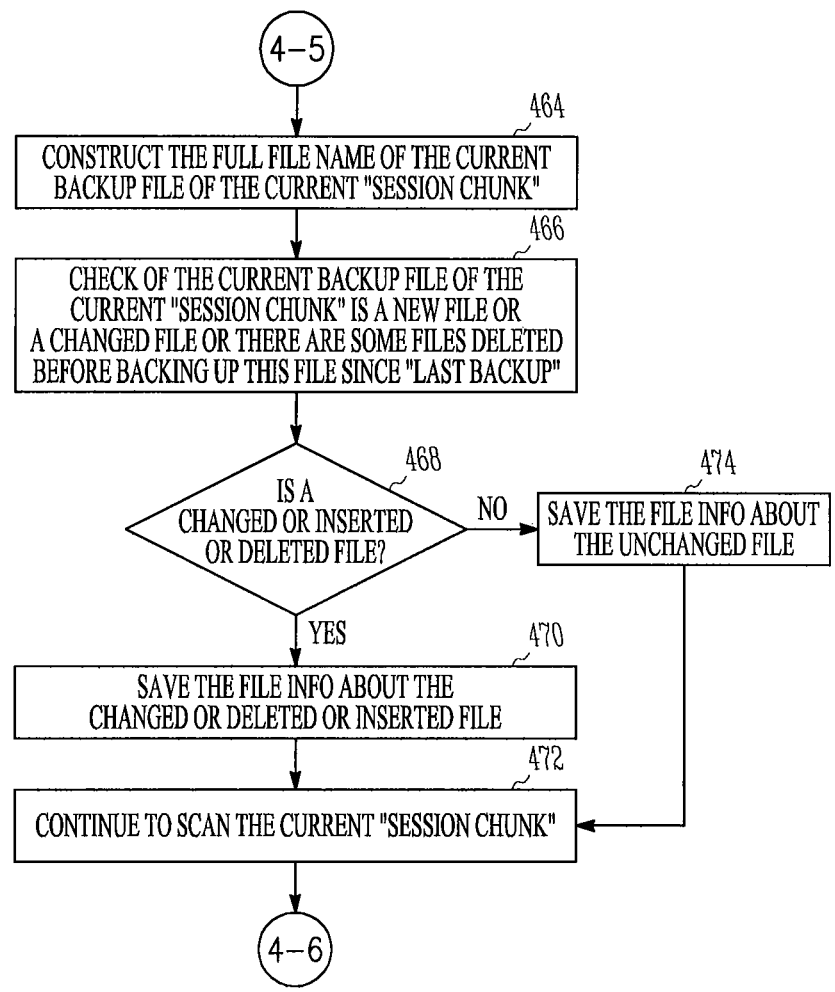
Figure 4F:
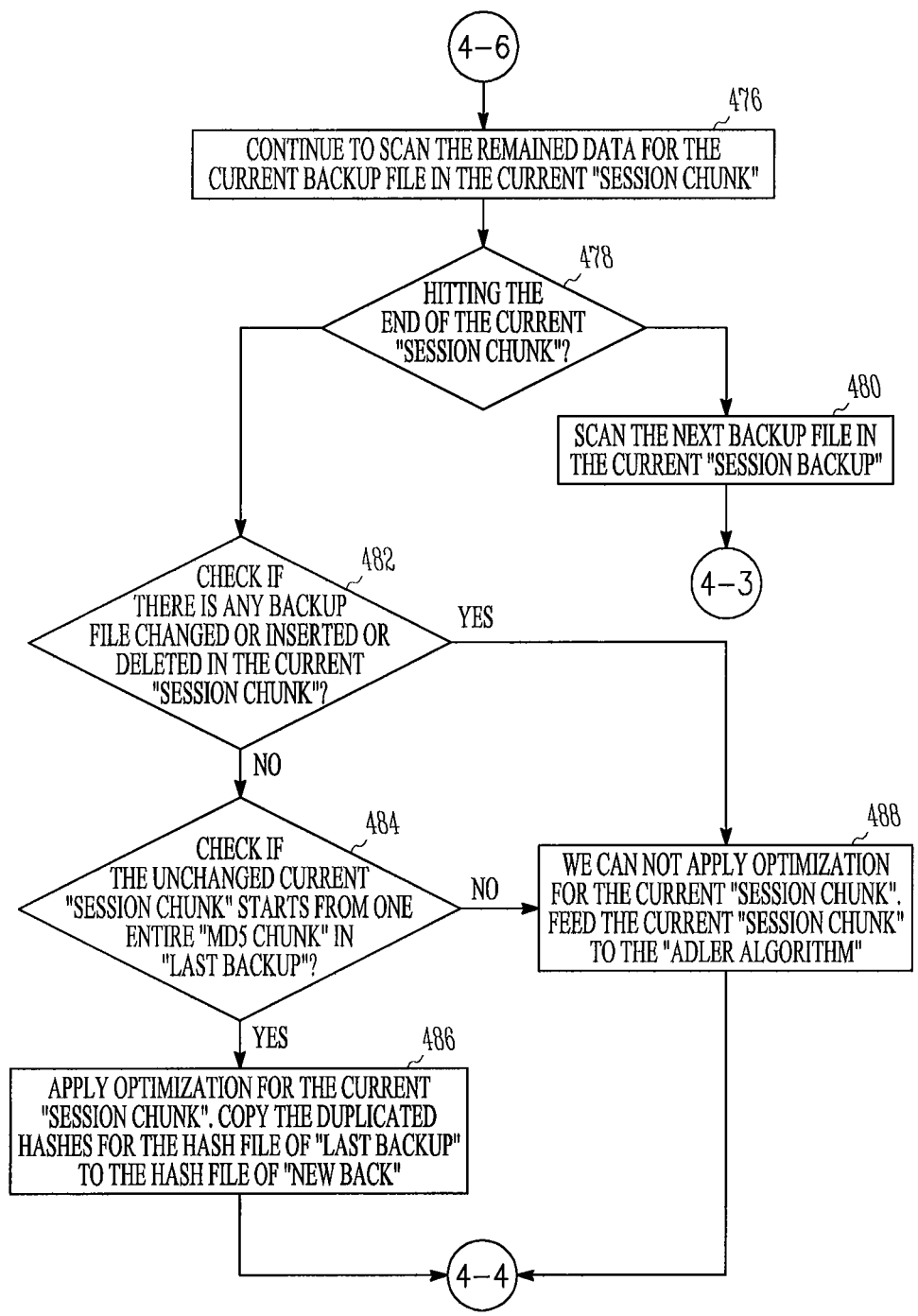
Figure 4G:
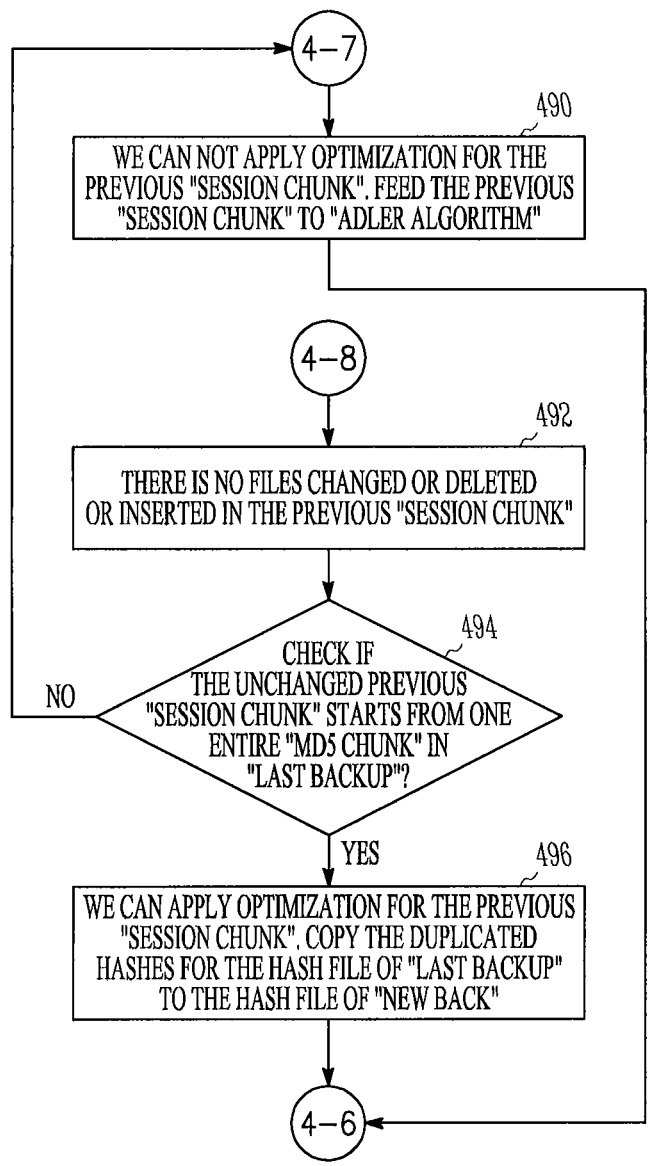

FIG. 3 is a block diagram 300 of metadata which may be used to create the metadata signature, along with the signature 310, which may be any length desired. In various embodiments, the metadata 300 may include one or more of the following information. Path 315, file size 320, attributes 325, security access control lists 330 and dates of last modification and creation 335.

FIGS. 4A, 4B, 4C, 4D, 4E, 4F and 4G are a detailed flow chart illustrating a computer implemented method of reducing hash processing for files which remain unchanged during a backup according to an example embodiment.

At 404, a backup from a source, such as a root directory, to a destination device is started. A term, new backup, is used to represent a current new backup. The term, session chunk, is used to represent on chunk of backup data. The data size of one session chunk in one embodiment is 1024 KB.

At 406, a first chunk of backup data of the current new backup is received. A session header is extracted from a first session chunk of the new backup at 408. Source is extracted at 410, along with a backup method, such as incremental, differential or full, from the session header of the new backup. At 412, a database is queried to fetch a session number of the last successful or incomplete backup corresponding to the same source and the same backup method and the same destination device.

At 416, a check is made to determine whether a user or default selection has been made to enable backup optimization for new backup. If not, a backup may be performed without optimization as indicated at 418. If optimization has been selected, a session type is extracted from the session header of new backup at 420, and a check is made at 422 to determine if new backup is a file system backup according to the session type of new backup. If not, the backup is performed without optimization as indicated at 424.

If a file system backup is indicated at 422, a check is made to determine if the new backup has a last backup at 426. If not, the backup is done without optimization at 424. If yes, at 428, a database is queried to fetch the catalog file name of last backup, the catalog file of last backup is opened at 430 and the first 100 items in one embodiment are loaded from catalog file of last backup to catalog list in memory at 432.

At 434, the first session chunk of new backup is fed to a method referred to as scan layer. Scan layer may be used for backup optimization and has responsibility to determine if a source file in new backup has been changed since last backup. At 436, scan layer scans the session header. A check is made at 438 to determine if there is an extended session header followed. If yes, it is scanned at 440 and in either event, normal backup file scanning is started at 442. At 444, the file header and file info (attributes . . . ) and file path name for the current normal backup file are scanned.

At 446, a check is made to determine if the end of the current session chunk has been encountered while scanning the file header, file info and file path name. If yes, the current session chunk is cached into a buffer in memory. Caching is done because the file name of the last backup file in the current session chunk is not known, and hence, it can not be determined yet if the file has changed since the last backup. Backup up the current session chunk is postponed after receiving the next session chunk. The next session chunk is received at 450, and a check is made to determine if the previous session chunk ends during the scan of the header\file info\file path name at 452. If yes, the current session chunk is scanned at 454 to get all the info about the file header\file info\file path name for the last backup file of the previous session chunk.

Figure 5:
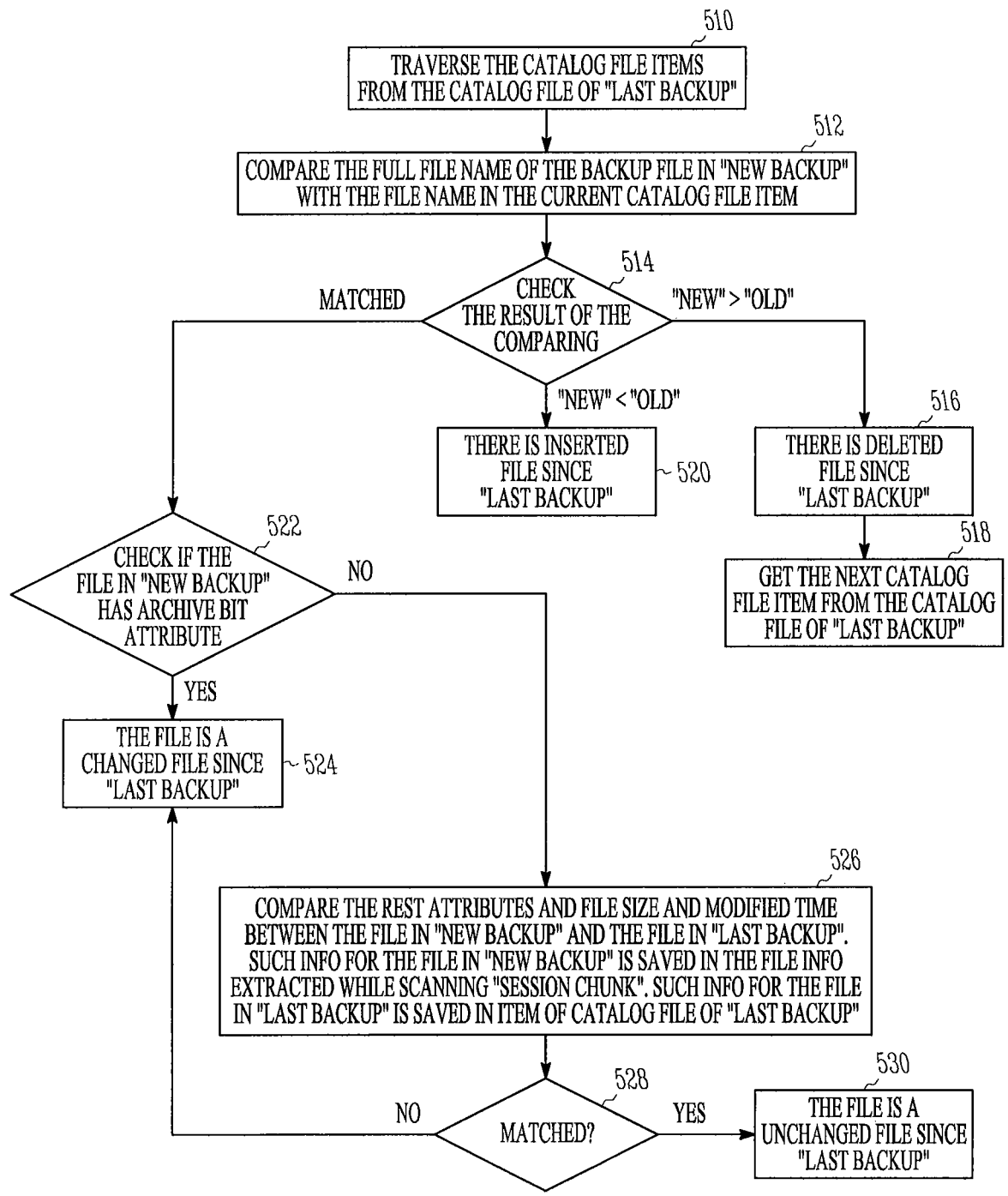
FIG. 5 is a flow chart illustrating a computer implemented method of identifying whether a file is unchanged since a last backup according to an example embodiment.

At 456, the full file name of the last backup file of the previous session chunk is constructed. At 458, a check is made to determine if the last backup file of the previous session chunk is a new file or a changed file or there are some files deleted before backing up the file since last backup. An example method of identifying a changed, deleted or inserted file since last backup based on catalog file of last backup is illustrated in FIG. 5, discussed below.

If there is no changed, inserted or deleted file as determined at 460, a check is made at 462 to determine if there is any one previous backup file in the previous session chunk changed, inserted or deleted.

If, back at check 446, it was determined that the end of the current session chunk was not encountered while scanning, the method continues at 464, where the full file name of the current backup file of the current session chunk is constructed. At 466, a check if the current backup file of the current session chunk is a new file or a changed file or there are some files deleted before backup of the file since the last backup. If yes, as determined at 468, the file info about the changed, deleted or inserted file is saved at 470 and scanning of the current session chunk continues at 472. If no was determined at 468, the file in for about the unchanged file is saved at 474 and scanning continues at 472.

Scanning of the remaining data for the current backup file in the current session chunk continues at 476 (a no indication from check 452 also leads to 476), and a check is made to determine whether the end of the current session chunk is hit at 478. If not, the next backup file in the current session chunk is scanned at 480, and the method continues at 450. If the end was hit at 478, a check is done to determine if there are any backup file changed, inserted or deleted in the current session chunk at 482. If not, a check is made at 484 to determine if the unchanged current session chunk starts from one entire MD5 chunk in the last backup. If yes, optimization for the current session chunk is applied at 486, and duplicated hashes are copied from the hash file of last backup to the hash file of new backup. If there were changes, insertions or deletions detected at 482, or if the unchanged current session chunk did not start from one entire MD5 chunk in last backup at 484, optimization is not applied for the current session chunk at 488, and the current session chunk is fed to the Adler algorithm.

When it was determined that there has been a changed, inserted or deleted file at 460, processing continues at 490 by realizing that optimization for the previous session chunk can not be performed. The previous session chunk is fed to the Adler algorithm, and processing returns to 476 to continue scanning the remaining data of the current backup file in the current session chunk.

If at 462, if it was determined that no previous backup file in the previous session chunk was changed, inserted or deleted, processing continues at 492, where it is realized that no files were changed, deleted or inserted in the previous session chunk, and a check is made at 494 to determine if the unchanged previous session chunk starts from one entire MD5 chunk in the last backup. If not, processing returns to 490. If yes, optimization may be applied for the previous session chunk. Duplicated hashes are copied from the hash file of last backup to the has file of new backup at 496.

FIG. 5 is a flow chart illustrating a computer implemented method of identifying whether a file is unchanged since a last backup according to an example embodiment. The method begins by traversing the catalog file items from the catalog file of last backup at 510. The full file name of the backup file in new backup is compared with the full file name in the current catalog file item at 512. A check is made at 514 to determine the result of the comparing. If new is greater than old, there is a deleted file since the last backup as indicated at 516, and the next catalog file item is obtained from the catalog file of last backup at 518, and the comparison is repeated at 512.

If the result at 514 indicates that new is less than old, a file has been inserted since the last backup as indicated at 520. If the comparison matched at 514, a check is made at 522 if the file in the new backup has an archive bit attribute. If yes, the file is identified as a changed file since the last backup. If no, at 526, the rest of the attributes and file size and modified time between the file in new backup and the file in last backup are compared. Such information for the file in new backup is saved in the file information extracted while scanning session chunk. Such information for the file in last backup is saved in item of catalog file of last backup.

At 528, a check is made to determine a match. If no match, the file is identified as changed since last backup at 524. If there was a match, the file is identified as unchanged since the last backup at 530

Figure 6:
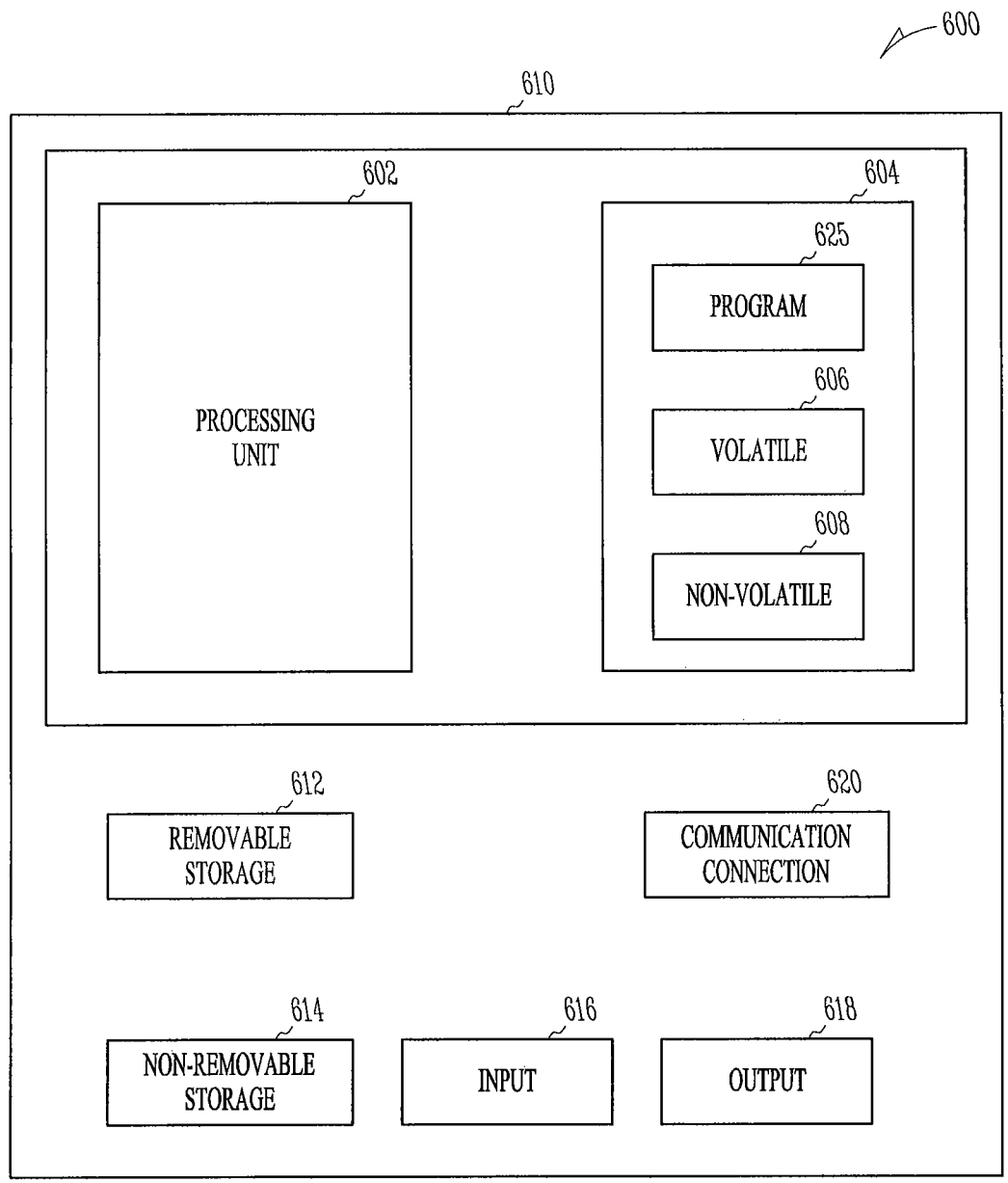
FIG. 6 is a block diagram of an example computer system 600 on which the methods of FIG. 4 may be executed.

FIG. 6 is a block diagram of an example computer system 600 on which the methods may be executed. System 600 in one embodiment includes hardware 610 such as a general computing device in the form of a computer. Hardware 610 may be coupled to storage device 615 and may contain multiple storage devices, 620 and 625, which respectively in one embodiment are a storage device or drive and USB memory port. Hardware 610, may include a processing unit, and memory. Memory may include volatile memory and non-volatile memory such as random access memory (RAM), read only memory (ROM), erasable programmable read-only memory (EPROM) & electrically erasable programmable read-only memory (EEPROM), flash memory or other memory technologies. Storage devices 620 and 625 may include compact disc read-only memory (CD ROM), Digital Versatile Disks (DVD) or other optical disk storage, magnetic cassettes, magnetic tape, magnetic disk storage such as floppy or hard, or other magnetic storage devices, or any other medium capable of storing computer-readable instructions.

Hardware 610 may include or have access to a computing environment that includes input/output devices 630, and a communication connection 635. The hardware 610 may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the hardware 610. A hard drive, floppy drive, USB memory stick, memory cards, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A computer implemented method comprising:
 selecting a file for potential backing up via the computer;
 calculating a metadata signature hash via the computer on data consisting of metadata which corresponds to the selected file;
 identifying an already backed up file corresponding to the selected file using an identifier which accompanies the metadata signature;
 comparing the metadata signature of the selected file to a metadata signature of the identified corresponding file already backed up via the computer; and only backing up the file to a computer readable storage device if the signatures do not match.

2. The method of claim 1 wherein the hash is calculated in accordance with an MD5 hash algorithm.

3. The method of claim 1 wherein the metadata includes a file path and size.

4. The method of claim 3 wherein the metadata further includes file attributes and security access control lists.

5. The method of claim 4 wherein the metadata further includes dates of last modification and creation of the file.

6. The method of claim 1 wherein the method is repeated for each file in a data storage system.

7. A computer implemented method comprising:
selecting a file for potential backing up;
obtaining metadata for the file via the computer, the metadata consisting of a file path and size, file attributes, file security access control lists, dates of last modification or creation of the file;
calculating a metadata signature hash on the obtained metadata via the computer;
identifying an already backed up file corresponding to the selected file using an identifier which accompanies the metadata signature;
comparing the metadata signature of the selected file to a metadata signature of the identified corresponding file already backed up via the computer; and
only backing up the file to a computer readable storage device if the signatures do not match.

8. A computer readable storage device having instructions for causing a computer to execute a method, the method comprising:
selecting a file for potential backing up;
calculating a metadata signature hash on data consisting of metadata which corresponds to the selected file;
identifying an already backed up file corresponding to the selected file using an identifier which accompanies the metadata signature;
comparing the metadata signature of the selected file to a metadata signature of the identified corresponding file already backed up; and
only backing up the file if the signatures do not match.

9. The computer readable storage device of claim 8 wherein the hash is calculated in accordance with an MD5 hash algorithm.

10. The computer readable storage device of claim 8 wherein the metadata includes a file path and size.

11. The computer readable storage device of claim 10 wherein the metadata further includes file attributes and security access control lists.

12. The computer readable storage device of claim 11 wherein the metadata further includes dates of last modification and creation of the file.

13. The computer readable storage device of claim 8 wherein the method is repeated for each file in a data storage system.

14. A system comprising:
a backup agent computer system adapted to couple to a data storage system and receive file data and metadata and calculate a signature hash for each file as a function of variables consisting of metadata; and
a backup server computer system coupled to receive the metadata signature from the backup agent, identify an already backed up file corresponding to the selected file using an identifier which accompanies the metadata signature, and compare the metadata signature for the selected file to a metadata signature of the already backed up identified corresponding file, and if the signature do not match, backing up the file corresponding to the metadata signature created by the backup agent.

15. The system of claim 14 wherein the hash is calculated in accordance with an MD5 hash algorithm.

16. The system of claim 14 wherein the metadata includes a file path and size.

17. The system of claim 16 wherein the metadata further includes file attributes and security access control lists.

18. The system of claim 17 wherein the metadata further includes dates of last modification and creation of the file.

19. The system of claim 14 wherein the method is repeated for each file in a data storage system.

* * * * *